(12) United States Patent
Noack

(10) Patent No.: US 7,073,353 B2
(45) Date of Patent: Jul. 11, 2006

(54) PRODUCTION OF MINERAL WOOL

(76) Inventor: Hans Peter Noack, Dusterstrasse 23a, 44797 Bochem (DE)

( * ) Notice: Subject to any disclaimer, the term of this patent is extended or adjusted under 35 U.S.C. 154(b) by 183 days.

(21) Appl. No.: 10/672,301

(22) Filed: Sep. 26, 2003

(65) Prior Publication Data

US 2004/0177650 A1    Sep. 16, 2004

Related U.S. Application Data

(63) Continuation of application No. PCT/EP02/01083, filed on Feb. 2, 2002.

(30) Foreign Application Priority Data

Mar. 26, 2001   (DE) ................ 101 14 985

(51) Int. Cl.
  *C03C 13/06*   (2006.01)
  *C03C 3/083*   (2006.01)
  *C03C 3/095*   (2006.01)

(52) U.S. Cl. ............... 65/134.8; 65/19; 65/66; 501/28; 501/36; 501/55; 501/64

(58) Field of Classification Search ............ 65/376, 65/482, 540, 19, 28, 29.16, 66, 122, 126, 65/134.8, 135.9, 335; 501/21, 27, 28, 35, 501/36, 38, 53, 55, 64, 68–72, 153–155; 75/746, 751, 764

See application file for complete search history.

(56) References Cited

U.S. PATENT DOCUMENTS

| 2,467,889 | A | * | 4/1949 | Harter et al. ................. 501/36 |
| 4,029,495 | A | * | 6/1977 | Hirayama .................... 75/10.4 |
| 5,198,190 | A | | 3/1993 | Philipp et al. |
| 5,352,258 | A | * | 10/1994 | DeGreve et al. .............. 65/474 |
| 6,125,660 | A | * | 10/2000 | Gorobinskaya et al. ....... 65/474 |

FOREIGN PATENT DOCUMENTS

| GB | 2 170 496 | | 5/1985 |
| SU | 1300776 | * | 10/1989 |
| WO | PCT/US84/01548 | | 9/1984 |
| WO | PCT/EP95/04394 | | 8/1995 |
| WO | PCT/AT98/00071 | | 3/1998 |
| WO | WO 99/28252 | * | 6/1999 |
| WO | WO 02/057194 | * | 7/2002 |

OTHER PUBLICATIONS

"Use of Spent Catalysts for Synthesis of Undercoat Enamels," Glass and Ceramics, May/Jun. 1995, vol. 52, No. 5/6, New York, pp. 135-136.

"Utilization of Waste," VP Krokhin, et al, Use of Petrochemical Waste In The Glass Industry. vol. 53 Nos. 5-6 1996, pp. 180-181.

* cited by examiner

*Primary Examiner*—Eric Hug
(74) *Attorney, Agent, or Firm*—Altera Law Group, LLC

(57) ABSTRACT

The invention relates to a method for producing mineral wool, whereby a cracking catalyst having an aluminum oxide content of at least 35% by weight is used as a base material or aggregate. Said catalyst materials produce waste products which are difficult to eliminate in the chemical industry and which can be reused in the production of mineral fibers and can be used in an economical and resource sparing manner.

9 Claims, No Drawings

PRODUCTION OF MINERAL WOOL

This application is a continuation internatinoal application number PCT/EP02/01083, filed 2 Feb. 2002. The application is incorporated herein by reference.

The invention relates to a method for the production of mineral wool during which, based on a viscous mineral melt containing silicon and metal oxides, fibers are produced that are further processed to obtain a woolen non-woven.

Mineral wool counts among the most frequently employed materials in thermal protection, noise control and fire-proofing applications. This is due to the fact that, on the one hand, mineral wool has excellent insulating characteristics and, on the other, is non-combustible (its melting point is above 1000° C.), water repellent, resistant to ageing and can be easily processed.

The base material used for mineral wool is rock, such as for example basalt and dolomite as well as quartz sand and other mineral aggregates. During production, the base materials are molten at temperatures ranging between 1300° C. and 1600° C. Subsequently, the viscous mineral melt is defibered which is brought about either by means of special defiberization rotors or rollers or with the help of a jet process. Added to the fibers are then bonding and, if applicable, impregnation agents following which the material is further processed to produce a wool non-woven. Such wool non-woven is compacted and finally subjected to a hardening treatment at temperatures ranging between 200° C. and 250° C. The final products are commonly insulating boards used for thermal insulation, sound- and fire-proofing purposes.

WO 96/14274 describes a method for the production of mineral wool which provides for a mineral base melt having a high of aluminum oxide ($Al_2O_3$) content. Mineral fibers made in accordance with the aforementioned method are advantageous in that they are durable and at the same time biologically degradable in the event the fibers are taken in by individuals via the anatomical airway. Due to their high aluminum oxide content the mineral fibers are highly resistant to alkalis which has positive effects on their durability characteristics when located in moist environments and improves their resistance to atmospheric influences. As a result of this high aluminum oxide content the workability of the fibers is enhanced as well because the viscosity of the base melt increases.

As aluminum oxide source materials found free in nature are commonly employed. Such materials are, in particular, bauxite and corundum. These materials are won through the exploitation of natural deposits. Nowadays, a major part of these deposits have been largely depleted already. Due to the scarcity of these raw materials and as a result of the high transportation costs arising when exploiting remotely located deposits the use of naturally occurring minerals as aluminum oxide source has another drawback in that it is very expensive.

In WO 85/01498 it has been proposed to make use of naturally occurring zeolites as silicon and aluminum oxide source for the production of glass and mineral fibers. A disadvantage in this context is however that the aluminum oxide content of naturally occurring zeolites is comparatively low so that for the production of the fibers additional aluminum oxide has to be added to attain the desired properties, in particular the high resistance to alkalis and good workability of the melt when producing fibers. Furthermore, the use of natural zeolites as a replacement for other aluminum oxide materials is no realistic option for economic reasons.

Proceeding from the aforementioned considerations it is the object of the present invention to improve the above described method for the production of mineral wool with a view to reducing the cost of raw materials and at the same time sparing naturally occurring resources.

Based on a method of the nature described above this objective is reached in such a manner that a spent aluminum silicate catalyst material having a content of at least 35% by weight of aluminum oxide is added to the mineral melt.

As proposed by the present invention a mixture comprising naturally occurring rock types such as diabase, basalt, dolomite or quartz sand and a catalyst material containing more than 35% of $Al_2O_3$ is initially prepared. This blend is then converted into a melt by treating it in a cupola furnace, for example. It is, furthermore, common practice to convert the individual components into a clinker material using for this purpose a bonding agent and water, and subsequently adding them to the melt in dried condition. As bonding agent customary cement types may be used, for instance fast setting portland cement but also ash resulting from the incineration of de-inking waste produced in the course of waste-paper recovery operations, all of these having a high mineral content. The clinker material usually contains between 8 and 20% by weight of bonding agents, after drying. Making use of the mixture proposed by the invention a liquidus temperature of the melt can be reached without difficulty that advantageously is in the range of about 1400° C. with said melt having a viscosity conducive to the production of fibers. If necessary, the viscosity of the melt can be lowered by adding alkaline earth metal oxides.

Fibers obtained in this way show a high aluminum oxide content in the range of approx. 20% by weight. This lends favorable properties to the fibers such as good durability and high resistance to moisture as well as alkalies; moreover, their biological degradability in a slightly acid pH environment is also good.

A powder-like aluminum silicate catalyst material suitable within the scope of the invention and having a high $Al_2O_3$ content arises in the form of waste in large amounts in the chemical industry. This involves primarily spent cracking catalysts employed in the production of gasoline/petrol from crude oil. The aluminum silicate catalysts, subjected to a prior homogenizing treatment, if thought expedient, may be made available for the production of mineral wool at low cost so that they can replace naturally occurring aluminum oxide minerals to a major extent. Furthermore, other valuable raw materials, for example bauxite, are thus spared and at the same time large amounts of waste substances are put to use in a sensible manner.

Typical aluminum silicate catalysts employed in petrochemical applications for the cracking of hydrocarbons consist of silicon oxide and aluminum oxide of roughly equal proportion. At a rule, they contain at least 40% by weight aluminum oxide and also a minimum of 40% by weight of silicon oxide. The remaining constituents usually present in materials of this kind do not interfere with the production of mineral wool, on the contrary, they even influence the properties of the mineral melt favorably.

It is to be noticed here that it is of advantage if the aluminum silicate catalyst material added according to the invention contains up to 5% by weight of magnesium oxide. Minor amounts of magnesium oxide reduce the melt's tendency towards crystal formation which is conducive to the production of fibers.

Catalyst waste materials arising in the chemical industry typically contain up to 1% by weight of titanium oxide.

Another advantage is that minor amounts of titanium oxide will further enhance the alkali resistance of the fibers produced.

It is also advantageous if the aluminum silicate catalyst material added in accordance with the invention contains up to 5% by weight of sodium and/or potassium oxide. The addition of alkali oxides in general leads to the melt temperature of the base mixture being reduced so that savings in energy costs are obtained.

Benefits are also attained with an up to 5% by weight content of rare earth oxides as usually found in aluminum silicate catalysts employed in petrochemical applications. It has been found that minor amounts of lanthanum oxide have a positive effect both on the melt properties and on the fibers produced from it.

The aluminum silicate catalyst material added to the mineral melt as proposed by the present invention is as a rule a synthetic zeolite powder. It is to be noted here that the customary employed cracking catalysts are in fact synthetic zeolites with a comparatively high $Al_2O_3$ content. The porous crystal structure of the zeolites contains lanthanoid elements as active centers. The use of zeolite powder offers aside from its high aluminum oxide content a number of additional advantages. On the one hand, there is a favorable chemical mixture of the constituents of the zeolites which enhances the homogeneity of the glass melt as well as the fiber production reproducibility. On the other hand, the zeolites contain appreciable amounts of adsorbed water. The materials are of highly hygroscopic nature and are usually present in hydrated form. Hydrated crystalline materials as a rule tend to melt at comparatively low temperatures. A reduction of the melting temperature is particularly desirable for the production of mineral wool with a view to saving energy costs.

It will be quite expedient for the zeolite powder to be subjected to a calcination pretreating process before it is added to the mineral melt. Such a pre-treatment is especially recommendable if the zeolite powder is a waste product stemming from chemical industry applications to eliminate hydrocarbon remnants that may still be present in the material.

Advantageously, the particle size of the zeolite powder used in accordance with the invention is below 100 μm. Such a finely grained powder material can be most easily blended with the remaining base substances and fused.

Provided the zeolite powder is of zeolite type A, X, Y or ZSM a particularly high aluminum oxide content is ensured. Preferably, the above mentioned zeolites that have a silicon-to-aluminum ratio of between 1 and 5 are used for large-scale production in the chemical industry.

An embodiment of the invention is indicated in the following table that shows the composition of an aluminum silicate catalyst material as it is customarily employed in the chemical industry as cracking catalyst:

|  | % by weight |
|---|---|
| $Al_2O_3$ | 45.2 |
| $SiO_2$ | 46.4 |
| $TiO_2$ | 1.7 |
| MgO | 0.01 |
| CaO | 0.01 |
| $K_2O$ | 0.03 |
| $CeO_2$ | 0.01 |
| $La_2O_3$ | 1.60 |
| $Nd_2O_3$ | 0.03 |
| $Pr_6O_{11}$ | 0.14 |

An especially suited bonding agent is CEM-Rock 488 produced by the company of Anneliese Baustoffe at Ennigerloh, Germany, a portland standard cement acc. to DIN 1164 with electrostatic precipitator ash as aggregate.

The invention claimed is:

1. Method for the production of mineral wool during which, based on a viscous mineral melt containing silicon and metal oxides, fibers are produced that are further processed to obtain a woolen non-woven, wherein a spent aluminum silicate catalyst material having a content of at least 35% by weight of aluminum oxide and a synthetic zeolite powder containing up to 5% by weight of rare earth oxides is added to the mineral melt.

2. The method according to claim 1, wherein the aluminum silicate catalyst material added contains at least 40% by weight of aluminum oxide and at least 40% by weight of silicon oxide.

3. The method according to claim 1, wherein the aluminum silicate catalyst material added contains up to 5% by weight of magnesium oxide.

4. The method according to claim 1, wherein the aluminum silicate catalyst material added contains up to 1% by weight of titanium oxide.

5. The method according to claim 1, wherein the aluminum silicate catalyst material added contains up to 5% by weight of sodium and/or potassium oxide.

6. The method according to claim 1, wherein aluminum silicate catalyst material added contains up to 5% by weight of lanthanum oxide.

7. The method according to claim 1, wherein the zeolite powder is subjected to a calcination pre-treatment before it is added to the mineral melt.

8. The method according to claim 1, wherein the particle size of the zeolite powder is below 100 μm.

9. The method according to claim 1, wherein the zeolite powder contains zeolite of types A, X, Y or ZSM.

* * * * *